Figure 1:
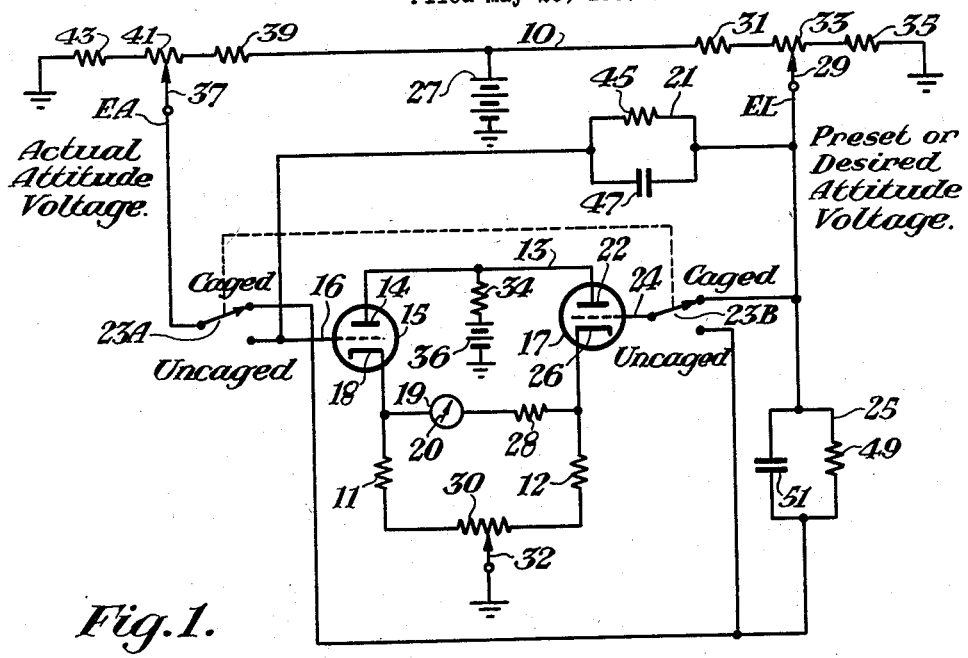

March 15, 1960  E. J. KLEINHAMPLE ET AL  2,928,188
SIMULATING CIRCUIT FOR GYROSCOPE INDICATORS
Filed May 28, 1957

INVENTORS
Edward J. Kleinhample and
Michael J. Draganjac.
BY
W. L. Stout.
THEIR ATTORNEY

United States Patent Office 2,928,188
Patented Mar. 15, 1960

2,928,188

SIMULATING CIRCUIT FOR GYROSCOPE INDICATORS

Edward J. Kleinhample, Sharpsburg, Pa., and Michael J. Draganjac, San Diego, Calif., assignors to Westinghouse Air Brake Company, Wilmerding, Pa., a corporation of Pennsylvania Application May 28, 1957, Serial No. 662,267

4 Claims. (Cl. 35—12)

This invention relates to aircraft pilot training aids, and particularly to improve gyroscope simulators for simulating the effects of caging, uncaging, and erection of gyroscope indicators.

To afford complete preflight training for pilots, various types of flight simulators must be provided to train the pilots to operate the various instruments which are employed in the operation of an actual aircraft. One of the basic instruments which a pilot must be trained to use is the gyroscope, since in the actual operation of aircraft gyroscopes are employed for a variety of applications. It is therefore desirable that preflight instructions designed to train pilots to make use of gyroscopes effectively, employ apparatus which closely simulates the actual operation of a gyroscope in an aircraft.

It is therefore a principal object of the present invention to provide circuitry for a flight trainer for simulating the operation of a gyroscope.

In one application a circuit according to the present invention is employed to test a pilot's ability to assume a preset flying attitude from an actual flying attitude by following a visual indication provided in the said circuit.

It is accordingly a further object fo our invention to provide a gyroscope simulator for simulating the effects of caging, uncaging, and erection of gyroscope indicators.

It is still a further object of our invention to provide a gyroscope simulating circuit for providing an indication of the movement of a gyroscope indicator from a caged or locked position to its freely rotating or uncaged position.

In the attainment of the foregoing objects of our invention we provide a simulating circuit for a gyroscope comprising an electrical bridge circuit including current control devices in opposite arms thereof. Means supplying a preset attitude voltage and means supplying a voltage which is a function of the actual attitude of the simulated aircraft are provided. A first time delay network including a resistor in parallel with a capacitor is connected to a first current control device, and a second network consisting of a resistor in parallel with a capacitor is connected to a second current control device. Switch means apply the preset attitude voltage and the actual attitude voltage alternately to said electron discharge devices to simulate the operation of a gyroscope. A needle marker of a nullmeter indicator connected in the electrical bridge circuit provides visual indication of the difference in said attitudes. Due to the time delay networks the needle marker simulates the movement of a gyroscope indicator and a pilot trainee may maneuver the training device to assume the desired attitude.

Figure 2:
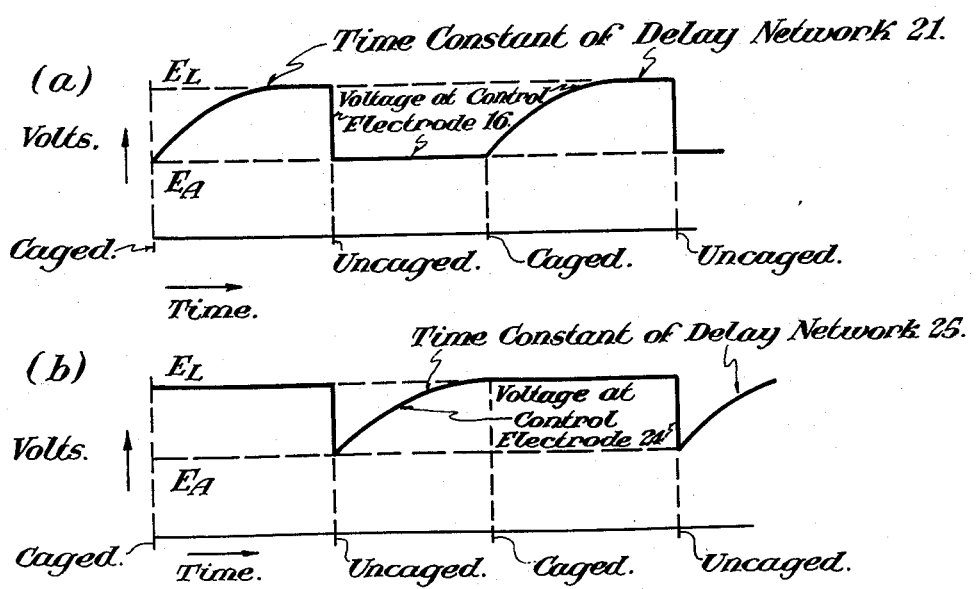

Other objects and advantages of the present invention will become apparent from the following description and the accompanying drawings in which:

Fig. 1 shows a schematic representation of the gyroscope simulating circuit according to the present invention, and Fig. 2 includes two graphs useful in explaining the operation of the circuit of Fig. 1.

We shall first describe one embodiment of a gyroscope simulating circuit embodying our invention and shall then point out the novel features thereof in the appended claims.

Referring now to Fig. 1, there is shown a gyroscope simulating circuit 10 comprising an electrical Wheatstone bridge 13 having two current control devices 15 and 17 in the form of electron discharge devices connected in two electrically parallel arms of the bridge. Electron discharge devices 15 and 17 are similar and include anodes 14 and 22, control electrodes 16 and 24, and cathodes 18 and 26, respectively. The other two arms of the electrical bridge 13 each include equal impedances in the form of resistors 11 and 12; resistor 11 being connected in series to cathode 18, and resistor 12 being connected in series to cathode 26. A null indicating voltmeter or nullmeter 19 including a marker needle 20 in series with a current dropping resistor 28 is connected between the cathodes 18 and 26 and thus across the balanced points of the electrical bridge 13. A voltage divider 30 is connected between resistors 11 and 12. A wiper arm 32 connected to ground reference and bearing on voltage divider 30 provides a means of adjusting the balance of the circuit to zero the nullmeter 19 as desired. The anodes 14 and 22 are connected in common through a voltage dropping resistor 34 to an anode potential source 36.

A direct current source 27 provides an operating potential for circuit 10. A voltage $E_L$ which is a function of a preset flying attitude of the aircraft training device is coupled directly from a first voltage dividing network consisting of resistors 31, 33 and 35, through a wiper arm 29 by means of switch means 23B to the control electrode 24 of electron discharge device 17. Resistors 31, 33 and 35 are connected between source 27 and ground. A voltage $E_A$ which is a function of an actual attitude of the aircraft training device is coupled directly from a second voltage dividing network connected in parallel to the first voltage dividing network, and consisting of resistors 39, 41 and 43, through a wiper arm 37 by means of switch means 23A to control electrode 16 of electron discharge device 15. The amplitude of the preset attitude voltage $E_L$ may be manually preset by the adjustment of wiper arm 29 to a desired attitude. The amplitude of the aircraft attitude voltage $E_A$ is established by the position of wiper arm 37 on resistor 41 and is a function of the actual attitude of the simulated aircraft.

As is known, signals of identical amplitudes applied to the two electron discharge devices 15 and 17 cause balanced currents to flow through the parallel arms of the bridge circuit 13 and hence through resistors 11 and 12 causing equal potentials to be developed across said resistors and resulting in a null reading on the meter 19.

In the caged position, switch means 23A and 23B which are ganged to one another, apply the preset attitude voltage directly to the electron discharge device 17 and disconnect the actual attitude voltage from electron discharge device 15. In the uncaged position, ganged switch means 23A and 23B apply the actual attitude voltage $E_A$ directly to electron discharge device 15 and interrupt the preset attitude voltage to electron discharge device 17. The switching of voltages $E_L$ and $E_A$ causes currents of different magnitude to flow in electron discharge devices 15 and 17 until a stable condition is reached, as will be explained hereinbelow, and results in the bridge circuit 13 being electrically unbalanced. This unbalanced condition is reflected in movement of the indicating needle marker 20 in the nullmeter 19 and simulates the movement of an indicating needle on an actual gyroscope indicator.

A time delay network 21 is connected between the wiper arm 29 and control electrode 16 of the electron discharge device 15. Delay network 21 may consist of a resistor 45 and a capacitor 47 connected in parallel, and has a time constant equivalent to the caging time of the gyroscope desired to be simulated. The impedance of resistor 45 is relatively large compared to the impedance of the resistors 39, 41 and 43 for reasons explained hereinbelow.

A second time delay network 25 is connected between wiper arm 29 and the caged position of switch 23A. Delay network 25 may consist of resistor 49 and a capacitor 51 connected in parallel, and has a time constant equivalent to the uncaging and erection time of the gyroscope desired to be simulated. The impedance of resistor 49 is relatively large compared to the impedance of resistors 31, 33 and 35 for reasons explained hereinbelow.

In the uncaged position of switches 23A and 23B, the voltage $E_A$ is applied directly to the control electrode 16 of electron discharge device 15; voltage $E_A$ also concurrently charges the capacitor 47 instantaneously to a charge equal to $E_L - E_A$. In the caged position of switches 23A and 23B, the capacitor 47 discharges exponentially and a voltage appears on the control electrode 16 as shown by the heavy solid line of graph (a) of Fig. 2. The impedance of resistors 41 and 43 to ground is relatively low compared to the impedance of resistor 45 so that there is no appreciable effect on control electrode 16 due to the voltage $E_L$.

In each of the graphs of Fig. 2 the horizontal ordinate or abscissa represents time intervals, and the vertical ordinate represents voltage amplitude. The time intervals are indicated as the caged and uncaged position of switches 23A and 23B. The dotted lines $E_L$ and $E_A$ indicate the amplitude of one possible initial adjustment of the attitude voltages.

In the caged position of switches 23A and 23B, the voltage $E_A$ is coupled to charge the capacitor 51 of delay network 25 instantaneously to a charge equal to $E_L - E_A$. In the uncaged position of switches 23A and 23B, the capacitor 51 discharges exponentially and a voltage appears on the control electrode 24 of electron discharge device 17 as shown by the heavy solid line of graph (b) of Fig. 2. The voltage $E_L - E_A$ which charged capacitor 51 during the cage position of switches 23A and 23B is combined with the voltage $E_L$ to produce a voltage as shown in the curve of graph (b), of Fig. 2. Due to the relatively low impedance of resistors 33 and 35 to ground and the relatively high impedance of network 25 including resistor 49 there is an appreciable effect on control electrode due to the voltage $E_L - E_A$.

Thus, the voltages applied to the electron discharge devices 15 and 17 vary in accordance with the resistance-capacitance time constants of time delay networks 21 and 25.

To simulate the operation of uncaging the gyroscope from a caged position as shown in Fig. 1, the switches 23A and 23B may be manually actuated to the uncaged position. The voltage $E_A$ which is a function of the actual flying attitude of an aircraft training device is then coupled directly to the control electrode 16 of electron discharge device 15, and current flow through electron discharge device 15 will be relatively constant, graph (a) Fig. 2. As noted hereinabove the resistance-capacitance characteristics of time delay network 25 causes the potential on capacitor 51, due to the charge impressed thereon by voltage $E_L - E_A$ during the cage position of switch 23A, to discharge and combine with voltage $E_L$; the voltage appears as an exponentially rising voltage on control electrode 24 as shown in graph (b), Fig. 2. Since the potential on control electrode 24 varies exponentially, the current flow through electrode discharge device 17 also varies exponentially until a stable or constant level is reached. Since electron discharge device 15 will conduct a relatively constant current due to the voltage $E_A$ on control electrode 16 and electron discharge device 17 will conduct an exponentially varying current, different amplitude voltages will be developed across resistors 11 and 12. The marker needle 20 of meter 19 will then be actuated to register the difference in current flow through the electron discharge devices 15 and 17.

In operation, the pilot trainee attempts to reduce the difference in actual attitude and the desired attitude by maneuvering the training device toward the desired attitude. Wiper arm 37 is thus actuated as a function of the actual attitude on voltage divider resistor 41 to tend to apply the proper voltage to the control electrode 16 to equalize the amount of current flowing through electron devices 15 and 17, such that the nullmeter 19 registers zero to indicate that voltages $E_L$ and $E_A$ are equal.

The caging operation of a gyroscope may be simulated by actuating the switch means 23A and 23B from the uncaged position to the caged position. The voltage $E_L$ is then coupled directly to the control electrode 24 of electron discharge device 17 and current flow through electron discharge device 15 will be relatively constant, graph (b), Fig. 2. The resistance-capacitance characteristics of time delay network 21 cause the potential on capacitor 47, due to the charge impressed thereon by voltage $E_L - E_A$ during the uncaged position of switch 23A, to discharge; the voltage appears as an exponentially rising voltage on control electrode 16 as shown in graph (a), Fig. 2. Electron discharge device 17 will conduct relatively constant current due to the voltage $E_L$ on control electrode 24, and electron discharge device will conduct an exponentially varying current. As above, the marker needle 20 of meter 19 will be actuated to register any differences in the voltages $E_L$ and $E_A$.

While our invention described with reference to a particular embodiment thereof, it will be understood that various modifications may be made by those skilled in the art without departing from the invention. The appended claims are therefore intended to cover all such modifications within the true spirit and scope of the invention.

Having thus described our invention, what we claim is:

1. In a flight training device a circuit for simulating the effects of caging, uncaging and erection of an aircraft gyroscope comprising in combination, means providing a first voltage corresponding to a desired flying attitude, means providing a second voltage corresponding to an actual flying attitude, switch means having a caged and an uncaged position, a balanced electrical bridge circuit, a current control device in each of two parallel legs of said bridge circuit, a first and second time delay network each including a capacitor being connected to said first voltage providing means directly and by said switch means to said second voltage providing means, said switch means in the caged position coupling said desired attitude directly to one current control device, said switch means in the uncaged position coupling said actual attitude voltage directly to the other current control device, the capacitor in said first time delay network being charged by the actual attitude voltage in the uncaged position of said switch means, the capacitor in said second time delay network being charged by the actual attitude voltage in the caged position of said switch means, said first delay network being arranged to provide an exponentially varying voltage to said first control device in the uncaged position of said switch means, said second delay network being arranged to provide an exponentially varying voltage to said second control device in the caged position of said switch means, one of said control devices having a relatively constant voltage applied thereto while said other control device has an exponentially varying voltage applied thereto, and visual means indicating any differences in said relatively constant voltage and said exponentially varying voltage whereby the operation of a gyroscope indicator is simulated.

2. In a flight training device a circuit for simulating the effect of caging, uncaging and erection of a designated aircraft gyroscope comprising in combination, means providing a first voltage corresponding to a desired flying attitude, means providing a second voltage corresponding to an actual flying attitude, switch means operable to a caged and an uncaged position, a balanced electrical bridge circuit, a current control device in each of two parallel legs of said bridge circuit, first and second time delay networks each including a resistor and a capacitor connected in parallel, said first time delay network arranged to have a time constant equivalent to the uncaging and erection time of the designated gyroscope, said second time delay network arranged to have a time constant equivalent to the caging time of a designated gyroscope, said switch means in the caged position coupling said desired attitude voltage directly to one current control device, said switch means in the uncaged position coupling said actual attitude voltage directly to the other current control device, the capacitor in said first time delay network being charged by the actual attitude voltage in the uncaged position of said switch means, the capacitor in said second time delay network being charged by the actual attitude voltage in the caged position of said switch means, said capacitor in said first delay network exponentially charging to the desired attitude voltage to provide an increasing voltage to said first control device when said switch means is actuated to the caged position, said capacitor in said second delay network exponentially charging to the desired attitude voltage to provide an increasing voltage to said second control device when said switch means is actuated to its uncaged position, one of said control devices having a relatively constant voltage applied thereto while said other control device has an exponentially varying voltage applied thereto, and visual means indicating any differences in said relatively constant voltage and said exponentially varying voltage whereby the operation of a gyroscope indicator is simulated.

3. In a flight training device a circuit for simulating the effects of caging, uncaging and erection of an aircraft gyroscope comprising in combination, means providing a first voltage corresponding to a desired flying attitude, means providing a second voltage corresponding to the actual flying attitude, switch means operable between a caged and an uncaged position, a balanced electrical bridge circuit, a current control device in each of two parallel legs of said bridge circuit, first and second time delay networks each including a resistor and a capacitor connected in parallel, said switch means in the caged position coupling said actual attitude voltage to said first time delay network to charge the capacitor therein exponentially to said actual attitude voltage, said switch means in the caged position coupling said preset attitude voltage to one of said control devices directly, said switch means in the uncaged position coupling said actual attitude voltage to said second time delay network to charge the capacitor therein exponentially to said actual attitude voltage, said switch means in the uncaged position coupling said actual attitude voltage to the second of said control devices directly, said time delay networks causing one of the said attitude voltages applied to one of said control devices to vary exponentially while the other of said attitude voltages is coupled to the other of said devices such that unbalanced currents flow in the arms of said electrical bridge circuit, and visual means indicating the rate at which current flow in said arms becomes equal and thus the rate at which said voltages become equal, whereby the caging, uncaging and erection of a gyroscope indication may be simulated.

4. A circuit for simulating the caging and uncaging operations of an aircraft gyroscope comprising in combination; means providing a reference voltage which is a function of a desired flying attitude; means providing a voltage which is a function of an actual flying attitude; an electrical bridge circuit having an electron discharge device in two parallel arms thereof; each of said electron discharge devices including an anode, a control electrode, and a cathode; first and second time delay networks each of which includes a resistor and a capacitance connected in parallel; the first of said time delay networks having a time constant equivalent to the caging time of said gyroscope; the second of said networks having a time constant equivalent to the uncaging time of said gyroscope; switch means, in one position, coupling said actual attitude voltage to the control electrode of the first of said electron discharge devices, and to said first time delay network to charge the capacitor therein to the actual attitude voltage; said switch means, in a second position, coupling said actual attitude voltage to said second time delay network to charge the capacitor therein to the actual attitude voltage; said switch means in a second position, coupling said reference voltage to the control electrode of the second of said second electron discharge devices; said delay networks arranged to provide an exponentially varying voltage to the control electrode of one of said electron discharge devices while the control electrode of the other of said electron discharge devices has one of the said attitude voltages applied directly thereto; such that unequal currents flow in the parallel arms of said bridge circuit; visual means providing an indication of said unequal current flow due to said differences in voltages applied to said electron discharge devices, whereby the caging and uncaging operations of an aircraft gyroscope may be simulated.

References Cited in the file of this patent

UNITED STATES PATENTS 2,774,940    Bernet _____ Dec. 18, 1956